J. LEDWINKA.
AUTOMOBILE BODY.
APPLICATION FILED OCT. 20, 1915.

1,275,274.

Patented Aug. 13, 1918.
6 SHEETS—SHEET 6.

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE-BODY.

1,275,274.  Specification of Letters Patent.  Patented Aug. 13, 1918.

Application filed October 20, 1915. Serial No. 56,967.

BEST AVAILABLE COPY

*To all whom it may concern:*

Be it known that I, JOSEPH LEDWINKA, a citizen of the United States, residing at Philadelphia, county of Philadelphia, State of Pennsylvania, have made a certain new and useful Invention in Automobile-Bodies, of which the following is a specification.

This invention relates to automobile bodies.

The object of the invention is to provide an automobile body which is light but strong and durable and capable of easily withstanding the rough usage, shocks and jars to which such bodies, in use, are subjected, and which has few parts, is of simple structure, and economical to manufacture.

A further object is to provide a structure of body shell which is capable of taking the stresses and strains, and which also gives shape and graceful contour for external appearance to the body.

A further object of the invention is to provide a stamped metal body of reduced weight, requiring but few parts and a less number of stampings, than has heretofore been found necessary, and wherein the sheet itself will take and stand the stresses and strains of usage and the tonneau may not be readily dented.

A further object is to provide a body structure for automobiles which specially lends itself to the use and application of removable seat and back cushion units.

A further object is to provide a body structure which permits the ready and easy adjustment of the front or drivers seat to accommodate different sizes of drivers or chauffeurs.

Other objects and features of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings—

The same part is designated by the same reference numeral wherever it occurs throughout the several views.

In my Patent No. 1,143,635, granted June 22, 1915, I have shown, described and claimed a structure of sheet metal body for automobiles in which is employed a skeleton frame to take the stresses and strains and a shell applied to the exterior surface of the frame to give external appearance to the body.

In my present structure I have dispensed with the skeleton frame and so construct the shell and its associated members as to secure the desired rigidity, strength and sturdiness of the body in the shell structure. In other words, in accordance with my present invention I propose to eliminate the skeleton frame of my former patent, and to so construct the shell and strengthening parts to be applied thereto and associated therewith as to enable it to take the stresses and strains, thereby greatly simplifying the structure, reducing the weight of the completed body, reducing the number of parts required, and enormously reducing the cost of production and assembly of the parts.

I also propose to so construct the body shell as to afford additional strength and rigidity along its bottom longitudinal edge by the application thereto of sill members in such manner as to form therewith, in effect, a box-girder which secures great strength to the body structure.

I also propose to so form and construct the body shell along its upper edge as to produce a channel which increases the strength and rigidity of the shell and also affords means for the application thereto of readily removable and replaceable upholstery, seat backs, and the like, and for conveniently and adjustably fitting the same in place, in conjunction with suitably supported and readily detachable, adjustable, removable and replaceable seats of novel structure.

I also propose to so construct the body shell as to assist in forming efficient and strong door jambs and frames in the sides of the body, to afford efficient means for attaching the mud guards thereto, for the application of the dash pan, and for various other novel features which I will hereinafter describe.

In carrying out my invention I provide the side panels 20, of sheet metal stampings. Each of these side panels is made in one piece and extends from a point at the rear of the rear door opening (indicated at 21, Fig. 1,) to the front end of the body, and is suitably shaped to form the outline and a graceful body curvature. It is provided with an upstanding portion 22, forming the front end posts and shroud or cowl, and with a portion 23, the latter between the front door opening 24 and the rear door opening 21, to form part of a door post. The sides 25 and rear curved portion 26 of the rear seat are formed of a sheet metal stamping the sides 25 of which are welded to the rear ends of the side panels 20, to unite the same into one integral structure.

Figure 6:
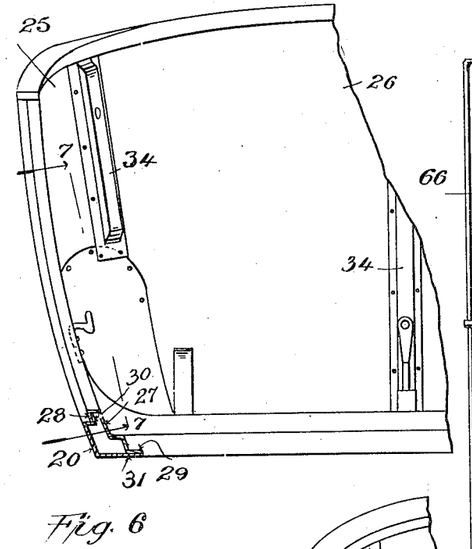
Fig. 6 is a broken view in vertical transverse section on the plane indicated at 6, 6, Fig. 1, and through the rear doorway sill.

Located inside the side panels 20, supported by the lower edges thereof are longitudinally extending sill members 27. These sill members are also of sheet metal stampings and serve to strengthen the shell structure of the body, and for this purpose, and as shown in cross section in Figs. 6 and 9, the sill members 27 are bent into substantially double-Z shape in cross section, terminating in flanges 28, 29, at their edges, which flanges are welded to the adjacent surfaces of the panels 20. While I have shown the sill members as being of generally double-Z shape in transverse section, my invention is not to be limited in respect to this detail as other shapes in cross section may be found to answer the purpose, and therefore, when I refer to said sill members as being of angular shape in cross section I wish to include any desired shape. In practice, and preferably, these sills should be so shaped as, in effect, when applied to the side panels, to form substantially box-girders, thereby greatly strengthening the body shell along its longitudinal lower edges. Thus at the side door way openings, the flange 28 of each sill member engages over a coöperating edge flange 30 of the shell panel, while at its lower edge each shell panel is bent inwardly as indicated at 31 and the flange 29 of the sill member rests thereon and is welded thereto. This makes a strong durable door sill structure, and the sill members, constructed and applied as above described, serve to strengthen the side panels and to secure rigidity of structure of the body.

Adjacent the rear edges of the rear door openings, and the front edges of the front door openings, if desired or required, a vertical flanged channel brace 32 may be applied to the inner surface of the side panels to form part of the door jambs and to secure rigidity of structure and take the strains and stresses of door slams. In order to still further strengthen the body structure, and secure a desirable rigidity, the lower ends of the vertical braces 32, may be extended transversely of the body to form cross tie 33, see Fig. 3, which is shown in this instance as a sheet metal stamping of generally channel shape in cross section, with edge flanges 37, which are welded or otherwise secured to the inwardly extending lower edge flanges 31 of the side panels. A cover strip 99 is applied over the meeting flanges of this panel 20 and member 32, to form a bolt chamber and to increase the strength and rigidity of the structure and give the same a finish to the edge.

If desired, and in order to still further strengthen the body structure, or the side or curved back portions of the rear or front seats, and to form top supports, vertically extending flanged channel shaped stampings 34, are applied at various or desired intervals to the inner surface of said seat backs or sides as clearly shown in the drawings.

Figures 3, 20:
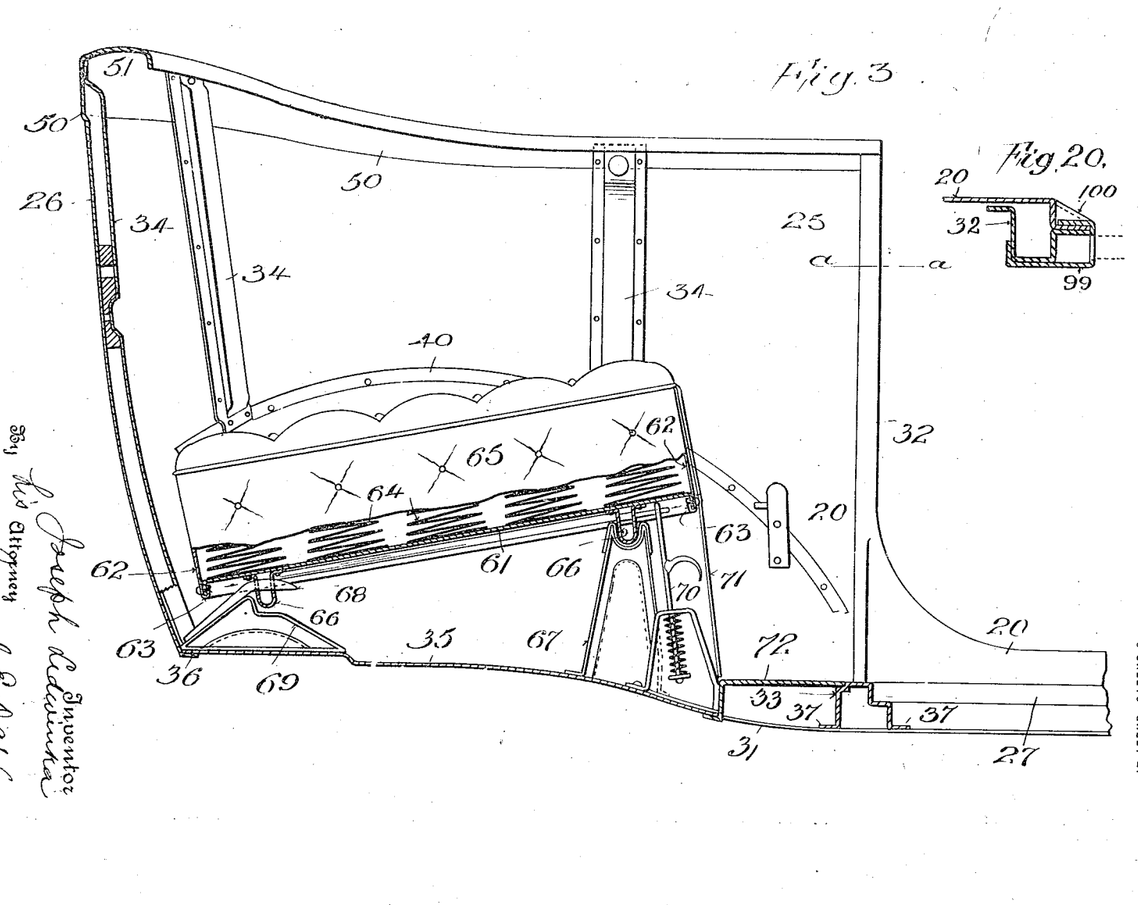
Fig. 3 is a vertical longitudinal central sectional view of the rear seat portion of the body showing the seat cushion in place and the seat back cushion removed, the plane of section being indicated at 3, 3, Fig. 2.
Fig. 20 is a broken detail view in section on the line a, a, Fig. 3.

The side panels 20, are flanged along the vertical edges of the rear side of the rear door opening to engage the flange of channel braces 32, as shown in Fig. 20, and the keeper or striker 100 for the door bolt is formed by pressing in a portion of the metal of the side panel itself. This avoids the necessity of applying a separate piece or strip in the door jamb to form the bolt striker and secures absolute uniformity in location of the striker and its proper positioning, and is a stronger, cheaper and more desirable structure.

The floor of the body, indicated at 35, is of sheet metal and is suitably secured, preferably by welding, at its edges, to the inturned flanges 36 at the lower edges of the side and seat panels 20, 26, and also to the lateral edge flanges of the plate 72 of the cross channels or tie braces 33, see Fig. 3.

Figure 7:
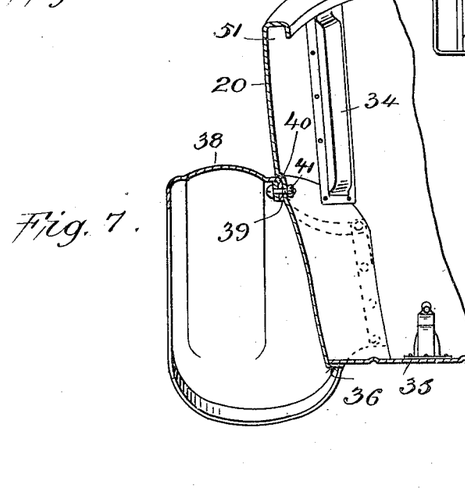
Fig. 7 is a similar view on the line 7, 7, Fig. 6, showing the manner of mounting the mud guard.

Another feature of importance is the manner of attaching the mud guard 38 to the body shell 20, reference being had to Fig. 7. In the form of embodiment of my invention as illustrated in this particular the mud guard is formed of sheet metal suitably stamped out to the desired shape and contour and is formed along its inner edge with a downwardly bent flange 39. The side panel 20 has an offset seat or recess, indicated at 40, pressed into the outer surface thereof along the curved line and contour of the inner edge of the mud guard and the flange 39 of the mud guard is seated and secured in the seat or recess thus formed in the side panel. I have shown bolts 41, as the securing means for the mud guard but in the broadest scope of my invention I do not desire to be limited in this respect. The structure described is very simple, avoids an objectionable angle joint, is neater and more sightly in appearance than the ordinary means employed to secure the mud guard in place, conceals the securing means and is a stronger and cheaper structure to make, and besides the resulting channel formed in the body shell lends strength and rigidity to the structure.

Figures 9, 10, 11, 12, 13:
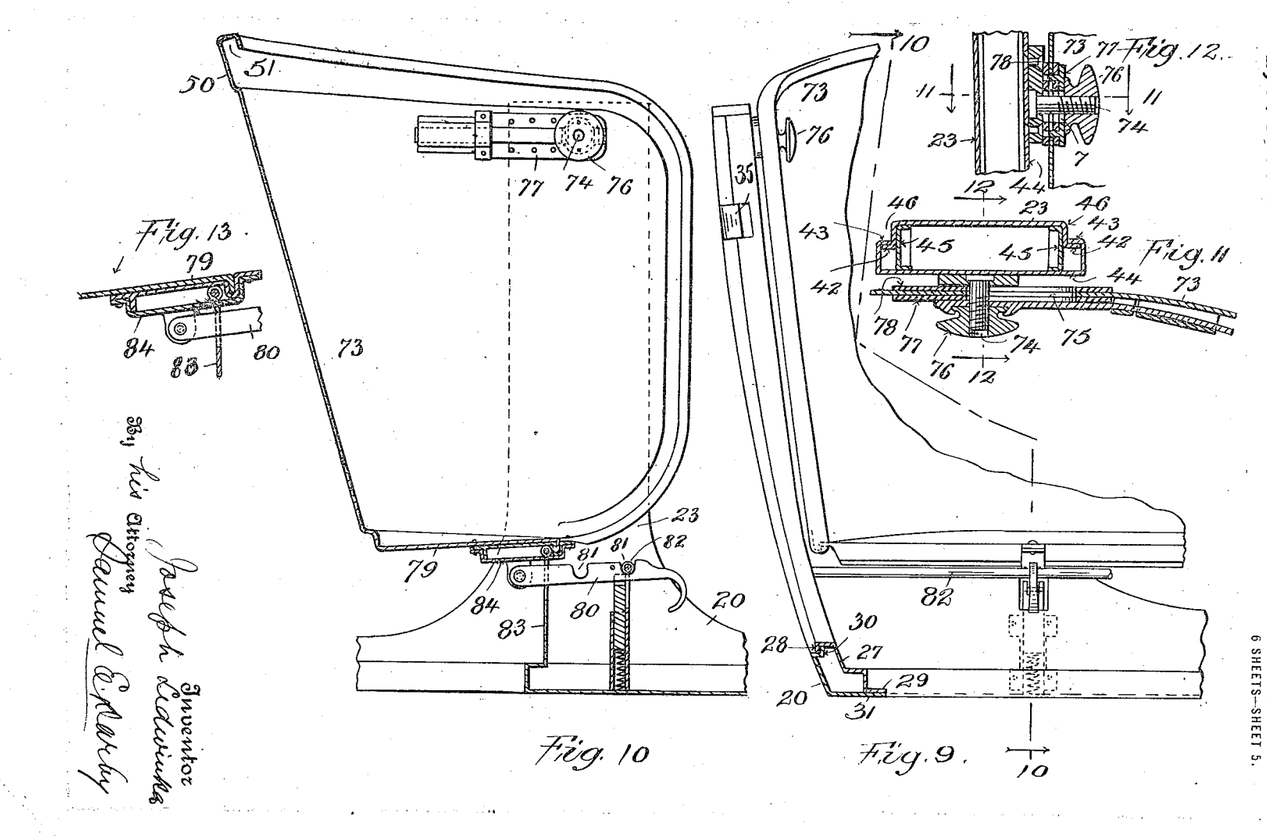
Fig. 9 is a view similar to Fig. 6, showing the front seat structure, the plane of section being transversely through the front doorway sill, as indicated at 9, 9, Fig. 1.
Fig. 10 is a view in vertical longitudinal section on the line 10, 10, Fig. 9.
Fig. 11 is a broken detail view in section on the line 11, 11, Fig. 12, showing means employed in connection with the adjustment of the front seat.
Fig. 12 is a similar view on the line 12, 12, Fig. 11.
Fig. 13 is a broken detail view in section on the line 10, 10, Fig. 9, showing a form of connection for adjusting the front seat.
Figure 14:
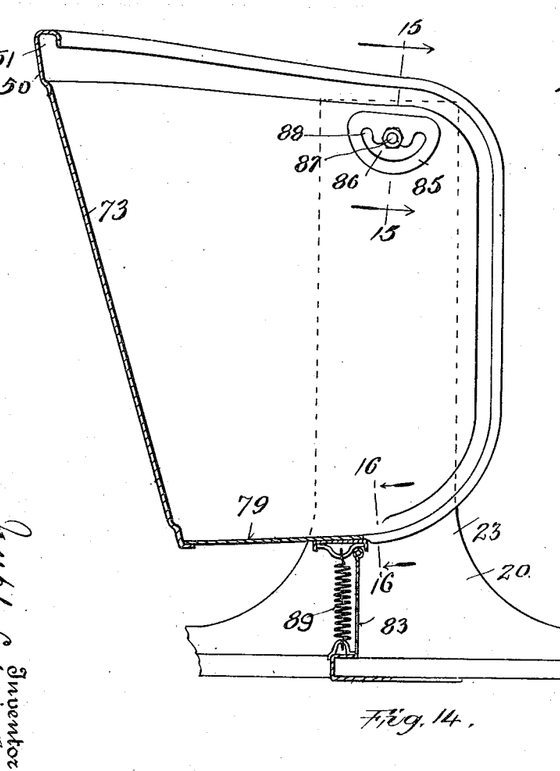
Fig. 14 is a view similar to Fig. 10, showing a modified construction of adjustable front seat.
Figures 15, 16, 17, 18, 19:
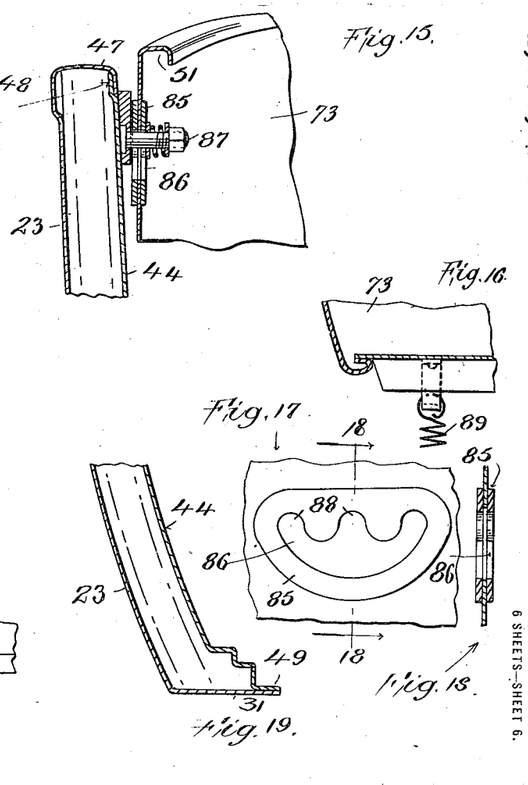
Fig. 15 is a broken detail view on the line 15, 15, Fig. 14.
Fig. 16 is a similar view on the line 16, 16, Fig. 14.
Fig. 17 is a broken detail view in front plan of a bracket employed in connection with the adjustment of the front seat in the form shown in Fig. 14.
Fig. 18 is a transverse section of the same on the line 18, 18, Fig. 17.
Fig. 19 is a vertical section through a door post on the plane indicated by lines 19, 19, Fig. 1.

Another feature of importance is the structure of the door posts. See Figs. 11, 12, 15 and 19. The upstanding portions 23 of the side panels constitute the outer member of the door posts. These upstanding portions are channel shaped in cross section, as seen in Fig. 11, and are provided with flanges 42 at their edges, over which engage edge flanges 43 of an inner channel shaped vertical member 44, thereby forming a hollow box structure composed of channel shaped members, the engaging flanged edges of which are preferably welded together. If desired, and in order to still further strengthen the door posts, and to insure sufficient rigidity thereto to enable the same to efficiently withstand the shock of door slamming, channel shaped vertically disposed members 45, are interposed between and preferably welded to the opposed surfaces of the members 23, 44, thus producing an exceedingly strong and efficient structure. The engaging laterally extending flanges 42, of member 23, and inwardly extending flanges 43 of member 44, form shoulders 46, constituting the door jamb. At its upper end (see Fig. 15) the portions 23 of the side panels are turned over inwardly to form a channel, as indicated at 47, and the upper end 48 of the inner member 44 is extended into this channel and welded or otherwise secured to the edge flange of the channel 47. To the inwardly extending flanges 31, at the lower edges of panels 20, the flanged lower ends of the inner vertical door post members 44 are welded or otherwise secured, as shown at 49, Fig. 19.

I will now describe the construction and arrangement for receiving and adjusting the detachable, removable, and replaceable side and back cushions or upholstery, and while I will describe this construction with reference to only the rear seat, it is to be understood that the same structure is equally well adapted for use in connection with the front seat.

Figure 4:
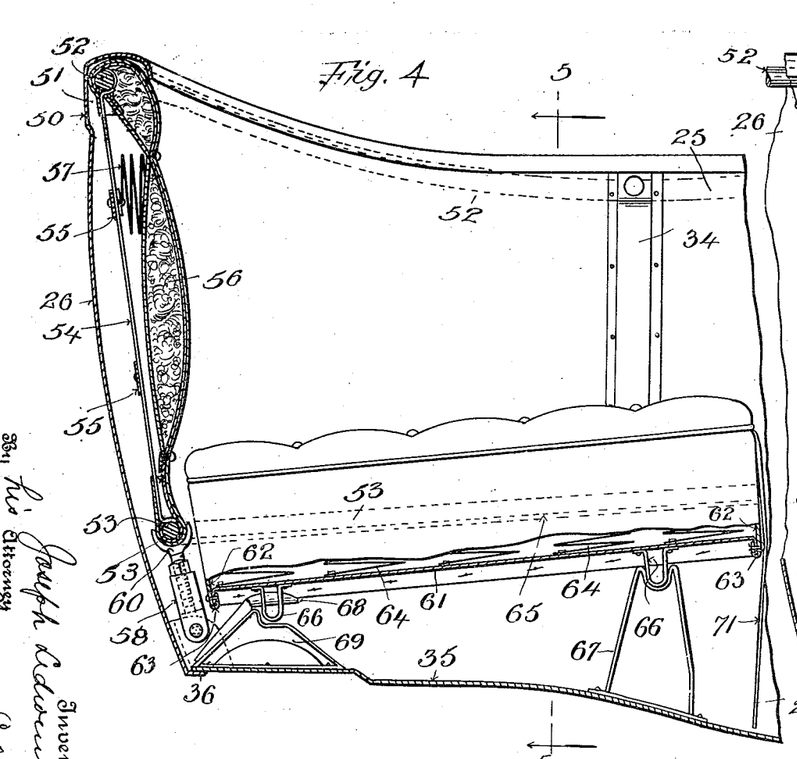
Fig. 4 is a similar view showing the seat back cushion in place.
Figure 5:
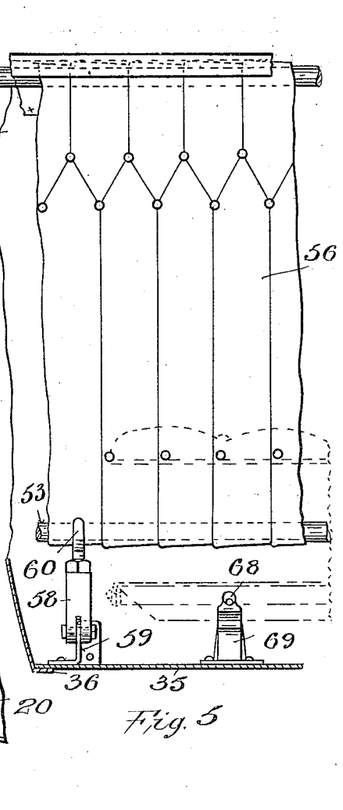
Fig. 5 is a broken view in transverse section on the line 5, 5, Fig. 4, with the seat cushion removed.

To give strength and rigidity to the side and rear curved portions 25, 26, of the seat panels, said panels are slightly pressed out or off-set along the upper edges thereof, as indicated at 50, and said edges, at the offset portions thereof, are bent inwardly and downwardly to form an inverted inner channel, as indicated at 51. This channel not only serves to strengthen the body by reason of its channel formation but it also affords a seat to receive the upper edge of the back and side cushion or upholstery frame. This frame, see Fig. 4, is composed of rods 52, 53, which are connected together by the vertical bars 54, the latter being connected by cross or horizontal straps 55, to form a flexible framework curved to the contour of the back and side portions of the body seat. The upholstery or cushion 56, which may be of any suitable or desirable structure and composition is connected at its top and bottom edges to the frame rods 52, 53, and, if desired, coil springs 57, may be interposed between the frame and the cushion to enhance the yielding characteristic thereof, and render the same more resilient and comfortable. The whole frame with the upholstery or cushion applied thereto constitutes a unit capable of being made up and carried in stock. In applying the upholstery or cushion frame to the body seat the upper edge of said frame is inserted and held in the inverted channel 51, at the upper edge of the body seat shell, into which it fits snugly. In order to easily and readily detach, remove and replace said cushion frame, I provide adjustable supports for the lower edge of said frame. In the particular form shown, to which, however, my invention is not to be limited or restricted, threaded socket pieces 58 are pivotally mounted upon flange brackets 59, see Figs. 4 and 5, secured upon the floor 35, at suitable and convenient points directly beneath the inverted channels 51. Supporting forks 60, are adjustably mounted in said sockets, and these forks form seats to receive the lower edge of the cushion frame. When the cushion frame is to be applied to the seat back its upper edge is inserted in the chamber 51, and its lower edge is seated in the fork arms 60, and then by suitably adjusting said forks the upper edge of the frame is forced snugly and neatly home into the inverted channel and held in place therein by the adjustable supports 60. By reversing this operation the cushion frame may be easily and readily detached and removed. This structure eliminates all wood parts heretofore employed in connection with the upholstery or cushions of automobiles as well as the necessity for special constructions for securing the upholstery to the seat back. It also enables the body to be made up complete and the cushion to be finished up complete and then the cushion to be simply inserted in its proper position without sending the body to a trim shop for the application of the trim thereto. This very greatly reduces the amount of handling of the body and the cost, and is exceedingly satisfactory in that the cushions may be detached, removed and replaced whenever desired and enables the car owner to change the color or style of the upholstering on his car at will.

In accordance with my invention I also propose to employ removable seat cushions and I will describe one structure embodying my invention as applied to the rear seat but it is to be understood that the same structure is equally well adapted for use in connection with the front seat cushion.

Figure 8:
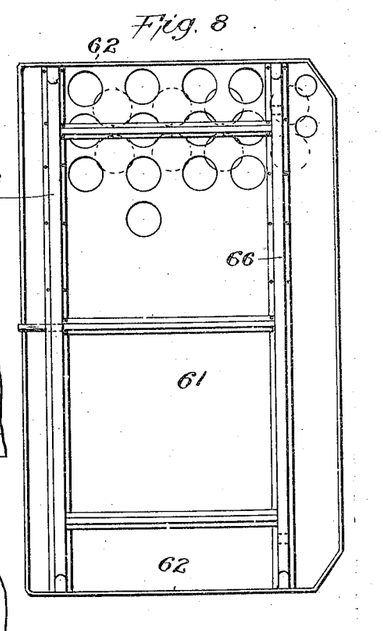
Fig. 8 is a bottom plan view of the seat cushion frame.

The seat cushion frame is made up of steel stampings consisting of a bottom sheet 61, flanged at its edges and over which flanges are engaged flanges of the side members 62 of the frame, as indicated at 63, thereby forming a box or receptacle in which the cushion springs 64, are mounted. The upholstery is supported by the springs and is detachably connected to the frame and a cover 65 is applied over the whole. Ribs 66 are secured to the lower face of the plate 61 at front and rear thereof. Standards 67, secured to the floor panel 35 provide seats to receive and support the forward rib 66. Openings are formed through the rear rib 66, to receive the hook members 68, carried by brackets 69, which are secured to the body floor panel 35.

This structure and arrangement is economical to manufacture and is very satisfactory. All wooden parts are eliminated and the seat cushion is readily and easily applied and detachable and removable. No seat super-structure is required such as is ordinarily employed in automobiles, thereby greatly reducing the cost and weight of the body.

When the seat cushion is once placed in proper position it may be locked in place by any suitable spring or other form of lock device, as indicated at 70. If desired, the forward flap 71 of the seat cushion cover 65 may be extended down to the floor of the body to conceal the seat supporting standards and the seat back devices.

To form a foot rest a transversely extending plate 72, may be employed which rests at one edge upon the transverse girder or cross tie 33, and at its other edge is secured to the floor 35. (See Fig. 3). This foot rest serves to additionally strengthen the body shell.

It may sometimes be desirable to adjust the front seat either forwardly or backwardly, or to adjustably tilt the same, in order to comfortably accommodate different drivers or chauffeurs. One of the features of my invention relates to means for securing this result, and in carrying out this feature of my invention I make the side and rear portions of the front seat shell in one stamping as indicated at 73, which is movably and adjustably supported on the door posts 23. In one arrangement, shown in Figs. 9, 10, 11, 12, and 13, I secure suitable studs 74, near the upper ends of the inner members 44, of the door posts. These studs extend through elongated slots 75 formed in the side portions of the shell panel 73, and carry clamp nuts 76 for clamping the parts in adjusted positions. Slotted reinforcing strips 77, 78, are placed on opposite sides of the shell 73, the stud 74, passing through the slots in said strips. By this construction the entire front seat shell may be shifted forwardly and backwardly to the extent permitted by the slot 75, and clamped in adjusted position, or it may be rocked or tilted about the axes of the studs 74. To accomplish this I pivotally attach to the floor portion 79 of the seat shell a latch 80 having notches 81 therein any one of which may be yieldingly pressed into engagement with a transversely extending rod 82, secured fixedly to the door post members 44. By detaching the latch 80 from rod 82, and shifting the seat shell so that some other notch 81 may be engaged with said rod, the desired adjustment is secured.

The seat shell is supported upon a transversely extending tie brace member 83, which connects the door posts on opposite sides of the body. The upper edge of this supporting brace member works in a keeper 84 applied to the under surface of the floor 79, to permit the shifting and adjusting movements of the seat shell.

In Figs. 14, 15, 16, 17 and 18, a modified arrangement for adjustably mounting the front seat shell 73 is shown. In this arrangement the same adjustments are secured as above described. Suitable plates 85 having arc shaped slots 86 are applied to the seat shell sides and the stud bolts 87, secured to the door posts extend through these slots and also through slots in the seat shell 73. The slots 86 have seats 88 formed therein into any one of which the bolt 87 may be seated to secure the desired adjustment. The seat shell in this form of my invention is movably held upon the supporting brace member 83 by means of a tension spring 89.

Another feature of my invention refers to the dash panel and the manner of applying the same to the shroud or cowl.

Figure 1:
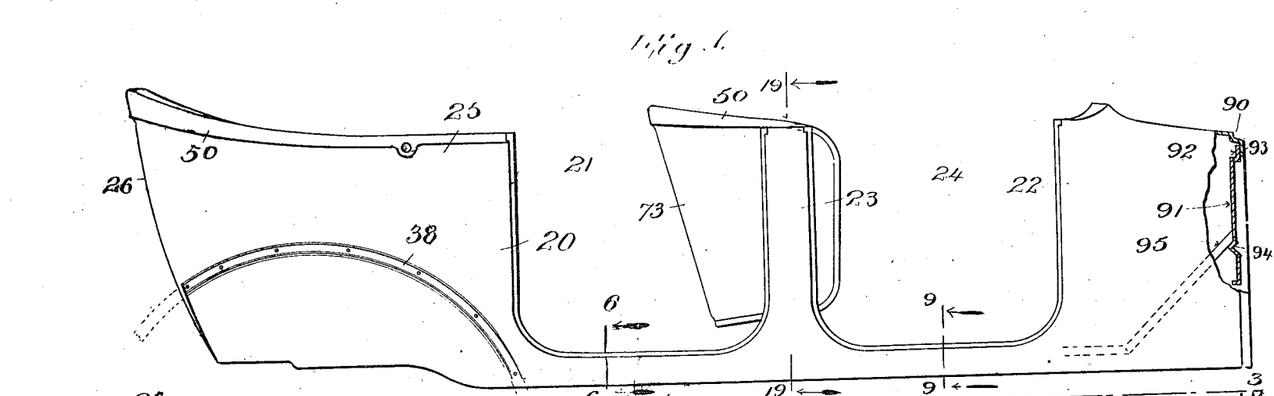
Figure 1 is a view in side elevation of an automobile body embodying the principles of my invention, parts broken out and parts in vertical section to show more clearly the hood ledge and dash pan structures.
Figure 2:
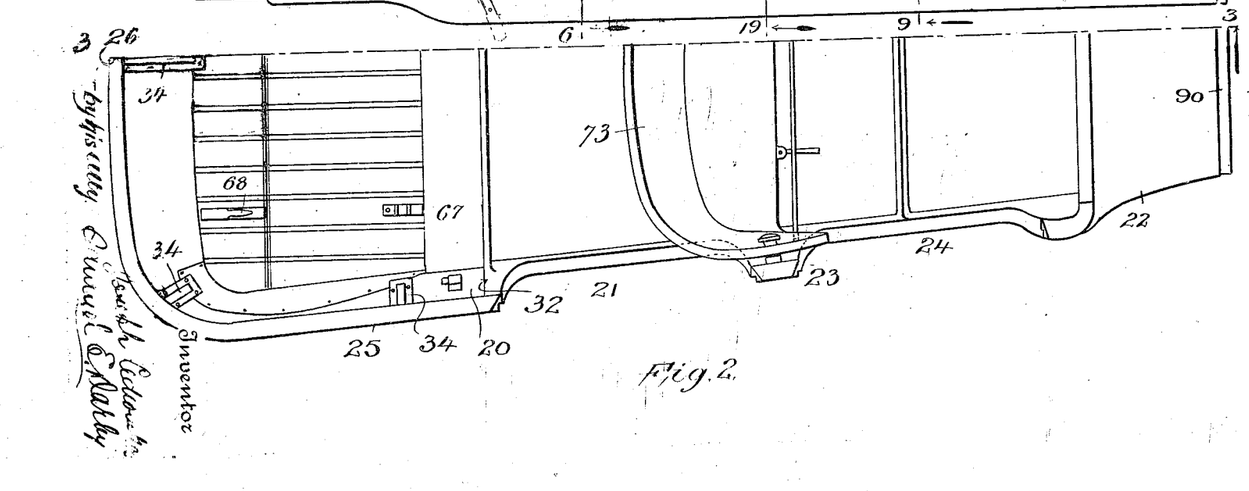
Fig. 2 is a partial top plan view of the same.

At its front edge the shroud or cowl has a seat or shoulder depressed therein as indicated at 90, see Figs. 1 and 2, to form a support to receive the edge of the hood (not shown). The dash pan 91 is in the form of a sheet metal stamping and is provided with an off-set flange 92, at its edge which fits against the downturned flange 93 at the edge of the shroud or cowl, the two flanges being secured together preferably by welding them. The pan has an inclined shoulder 94 pressed therein to form a support for the toe board 95.

This structure of dash panel and method of connecting the same avoids sharp corners at the hood ledge, is strong and exceedingly simple and economical to manufacture and assemble, and does away with separate supports for the toe board 95.

An automobile body structure embodying the features hereinbefore set forth is exceedingly simple, economical to make and to assemble and greatly reduces the cost of manufacture of such bodies. The body shell, constructed as described, is reinforced along its top and bottom edges, also by vertical strengthening ribs, and cross connecting tie braces, which enables said shell to take the stresses and strains and also to give graceful external form, shape and appearance to the body, thereby eliminating much of the weight and material heretofore employed in the construction of such bodies, reducing the weight of the finished article, and greatly facilitating the rapidity of manufacture thereof, and reducing the cost of construction and of upkeep and maintenance of the machine to which the body is applied, without sacrificing anything of strength and rigidity.

It is to be understood that many variations, changes and modifications may be made in the details of structure and in the arrangement and relation of the parts without departure from the spirit and scope of my invention as defined in the claims.

But having now set forth the objects and nature of my invention, and a construction embodying and illustrating the principles thereof, what I claim as new and useful and of my own invention, and desire to secure by Letters Patent is,—

1. An automobile body shell built up of sheet metal stampings pressed to the shape and contour of the body lines to give external appearance to the body, said stampings being integrally united, and having an inturned flange at their lower edges, and a longitudinally extending stamping supported upon said inturned flange and secured thereto and to the vertical portions of the body shell stampings to form a box-girder with the body shell whereby the body shell is reinforced to enable it to wholly take the strains of usage.

2. An automobile body shell built up of sheet metal stampings pressed to the shape and contour of the body lines to give external appearance to the body, said stampings being integrally united and having their upper edges formed into inverted reinforcing and upholstery receiving channels and having an inturned flange at their lower edges, and a longitudinally extending stamping supported upon said inturned flange, and secured thereto and to the vertically extending portions of the body shell stampings, to form a box-girder with the body shell, whereby the body shell is reinforced to enable it to wholly take the strains of usage.

3. An automobile body shell built up of sheet metal stampings pressed to the shape and contour of the body lines to give external appearance to the body, said stampings being integrally united, said stampings having inturned longitudinally extending flanges at their lower edges, and a longitudinally extending stamping secured to said inturned flange and to the vertical portions of said stampings, said longitudinally extending stamping being of channeled formation and presenting outwardly toward the inner surface of the body shell stampings, and forming therewith a reinforcing box-girder, whereby the body shell is enabled to wholly take the strains of usage.

4. An automobile body shell consisting of sheet steel stampings pressed to the shape and contour of the body sides and rear seat back and integrally united together, and forming an inverted flange and an inwardly extending flange at the top and bottom edges thereof, respectively, and a longitudinally extending outwardly presenting member of channeled formation secured to the said inturned flange and to the vertical portions of the body shell stampings, and transversely extending channel shaped stampings secured at their ends to the inwardly extending flanges of the body shell stampings, the whole forming a single unitary structure wholly to take the strains of usage.

5. An automobile body shell consisting of sheet metal stampings pressed to the required shape and contour and integrally united, and having an off-set inwardly extending channel or seat pressed in the outer surface thereof, and a mud guard having a downwardly extending flange at the inner edge of the crown thereof, said channel or seat being curved longitudinally into the line and contour of the inner flanged edge of the mud guard to receive and form a housing for the downwardly extended flange of the latter, said flange being secured in said seat.

6. An automobile body shell made up of sheet metal stampings pressed to the required shape and contour, and integrally united, said stampings having vertically extending channel shaped members with lateral flanges, to form part of a door post, and inner channel shaped members having flanges to engage over the lateral flanges of the vertical shell members to form door jamb shoulders.

7. An automobile body shell made up of sheet metal stampings pressed to the required shape and contour, and integrally united, said stampings having vertically extending channel shaped members to form part of a door post, inner channel members engaging the vertical shell members, and strengthening channel stampings interposed between and secured to said members.

8. An automobile body shell made up of sheet metal stampings pressed to the required shape and contour, and integrally united, said stampings having vertically extending channel shaped members with lateral flanges to form part of a door post, inner channel shaped members having flanges to engage over the said lateral flanges to form door jamb shoulders, and strengthening channel stampings interposed between said members adjacent said shoulders.

9. An automobile body shell consisting of sheet metal stampings pressed to the required shape and contour and integrally united, and having vertically extending integral portions to form the cowl or shroud, said vertical portions having a circumferential depression in the exterior surfaces thereof at their extreme forward edges, to form a ledge or support for the proximate edges of the hood, the said vertical portions, at the forward edge of said depression, being formed with an inwardly extending flange, and a dash panel stamping having its peripheral edge secured against the inner surface of said flange.

10. An automobile body shell consisting of sheet metal stampings pressed to the required shape and contour and integrally united, and having vertically extending integral portions to form the cowl or shroud, a dashpanel stamping secured to the forward edges of said vertical portions, and having a shoulder or ledge pressed in the surface thereof, said shoulder or ledge extending horizontally transversely across the inner surface of said dashpanel, and a toe board supported at its upper edge upon said ledge or shoulder.

11. An automobile body shell including a sheet metal stamping having a door opening formed therein, the upper edge of said stamping being flanged, and a longitudinally extending member attached to the lower edge of said stamping and having a portion engaging over said flange to form the sill of the door opening.

12. An automobile body shell including a sheet metal stamping having a vertical portion to form part of a door post, said vertical portion having a flange at its edge, a vertical reinforcing channel shaped member applied to said vertical portion and having a flange secured to the first mentioned flange, and coöperating therewith to form a door jamb and a cover member applied over said channel member and said flanges.

13. An automobile body shell including a sheet metal stamping having a vertical portion to form part of a door post, said vertical portion having a flange bent inwardly and then laterally to form a shoulder at its edge, a vertical reinforcing channel shaped member applied to said vertical portion and having a flange secured to the first mentioned flange, and coöperating therewith to form a door jamb and a bolt striker pressed into the flanged edge of said vertical portion.

14. An automobile body shell including sheet metal stampings, each having an integral vertical portion to form part of a door post, and a transversely extending reinforcing member connecting the side stampings and having integral vertically extending portions secured to the door post portions of the side stampings.

15. An automobile body shell including sheet metal side stampings each having an integral flanged vertical portion to form part of a door post, and a transversely extending reinforcing member connecting the side stampings and having integral vertically extending flanged portions secured to the flanged door post portions of the side stampings.

In testimony whereof I have hereunto set my hand in the presence of the subscribing witnesses, on this 14th day of October, A. D., 1915.

JOSEPH LEDWINKA.

Witnesses:
P. E. BOLNEMAN,
A. H. BUXBAUM.